(12) United States Patent
Kurachi et al.

(10) Patent No.: US 8,074,565 B2
(45) Date of Patent: Dec. 13, 2011

(54) SYSTEMS FOR MANUFACTURING NOODLE CASINGS

(75) Inventors: Masayasu Kurachi, Kounan (JP); Hideto Ohmi, Kounan (JP)

(73) Assignee: Yutaka Mfg. Co., Ltd., Kounan-shi Aichi (JP)

( * ) Notice: Subject to any disclaimer, the term of this patent is extended or adjusted under 35 U.S.C. 154(b) by 1072 days.

(21) Appl. No.: 11/723,411

(22) Filed: Mar. 20, 2007

(65) Prior Publication Data

US 2007/0190217 A1    Aug. 16, 2007

(51) Int. Cl.
- *A21C 9/04* (2006.01)
- *A23L 3/00* (2006.01)
- *A47J 37/08* (2006.01)
- *A47J 37/12* (2006.01)
- *B26D 1/00* (2006.01)

(52) U.S. Cl. ............ 99/450.2; 99/360; 99/386; 99/404; 99/420; 99/509

(58) Field of Classification Search .............. 99/450.2, 99/443 C, 360, 386, 404, 420, 421 R, 424, 99/432, 442, 509

See application file for complete search history.

(56) References Cited

U.S. PATENT DOCUMENTS

| 4,516,487 A | * | 5/1985 | Madison et al. | ............. 99/450.6 |
| 2006/0222748 A1 | * | 10/2006 | Kobayashi et al. | ........... 426/502 |

FOREIGN PATENT DOCUMENTS

| JP | 7194289 | | 8/1995 |
| JP | 2001078652 | | 3/2001 |
| JP | 2002330692 | | 11/2002 |
| JP | 2002330692 A | * | 11/2002 |
| JP | 2005060102 | | 3/2005 |
| JP | 2005060102 A | * | 3/2005 |
| WO | 9402394 | | 2/1994 |

OTHER PUBLICATIONS

JP_2002330692_A_H.pdf machine translation.*

* cited by examiner

*Primary Examiner* — Henry Yuen
*Assistant Examiner* — Ket D Dang
(74) *Attorney, Agent, or Firm* — Dennison, Schultz & MacDonald

(57) ABSTRACT

A system for manufacturing noodle casings includes a take-out device disposed between two conveyers. One of the conveyers serves to transfer a noodle sheet that has been punched to form noodle casings. The other of the conveyers serves to transfer a remaining noodle sheet. The take-out device is operable between a first position at the transfer level of the conveyers and a second position for permitting the noodle casings to fall onto another conveyer.

16 Claims, 5 Drawing Sheets

SYSTEMS FOR MANUFACTURING NOODLE CASINGS

BACKGROUND OF THE INVENTION

1. Field of the Invention

The present invention relates to systems for manufacturing noodle casings that are used for jiao-zis, won-tons, spring rolls and the like.

2. Description of the Related Art

In general, in order to manufacture noodle casings, water that contains additives (such as salt and oil) is added to and mixed with wheat flour or the like. The mixture is then stirred to form noodle dough. The dough is rolled until a noodle sheet having a predetermined thickness is obtained. The noodle sheet is placed on a conveyer and is folded (in a suitable time and a suitable length). The folded noodle sheet is then fed to a punching device having a punching die. The punching die includes a plurality of punching die parts each having a predetermined configuration corresponding to noodle casings to be obtained, so that a plurality of noodle casings can be formed by the punching die parts. The folded and punched noodle casings are then separated from the remaining portion of the folded noodle sheet. The noodle casings are thereafter transferred to a packaging machine, while the remaining portion is transferred to a recovering machine.

Conventionally, in order to separate the noodle casings from the remaining portion of the noodle sheet, a vertically movable conveyer is disposed below the punching die so as to vertically oppose to the punching die. After the noodle casings have been formed by punching the folded noodle sheet, the conveyer moves downward, so that the noodle casings moves downward together with the conveyer, while the remaining portion of the folded noodle sheet is held to be positioned at a transferring level. After the noodle casings have been moved downward, the remaining noodle sheet is transferred to the recovering machine. On the other hand, the noodle casings are transferred to the packaging machine by the conveyer. This conventional technique is disclosed, for example, in Japanese Laid-Open Patent Publication No. 2002-330692.

However, in the conventional technique, the conveyer is moved downward together with the noodle casings after the noodle casings have been formed by the punching machine and the remaining portion of the folded noodle sheet is held in the transfer level. Therefore, a difficult adjustment is required between the timing of the vertical movement of the transfer conveyer and the timing of the punching operation by the punching die. Therefore, it is difficult to smoothly sequentially perform the operations for punching the folded noodle sheet to form the noodle casings, separating the noodle casings from the remaining portion of the folded noodle sheet, and transferring the noodle casings and the remaining portion to the next steps independently of each other.

SUMMARY OF THE INVENTION

The present invention is provided to enable automatic (without need of manual operation), smooth and hygienical performance of the operations for punching a noodle sheet to form noodle casings, and to separate the noodle casings from the remaining portion of the noodle sheet, and transfer the noodle casings and the remaining portion of the noodle sheet to the next steps independent of each other.

One aspect of the present invention can include a system for manufacturing noodle casings. The systems include a folding device, a first conveyer, a second conveyer, a punching device, a third conveyer, a take-out device and a fourth conveyer. The folding device serves to roll a noodle dough into a noodle sheet having a predetermined thickness and to fold the noodle sheet in a predetermined time and a predetermined length. The first conveyer transfers the folded noodle sheet. The second conveyer receives the folded noodle sheet from the first conveyer at a transfer level of the first conveyer. The punching device is disposed to oppose the second conveyer and is operable to punch the folded noodle sheet to form the noodle casings, so that the punched folded sheet includes the noodle casings and a remaining folded noodle sheet. The third conveyer receives the remaining folded noodle sheet from the second conveyer and transfers the remaining folded noodle sheet to a next step. The third conveyer is positioned at the transfer level of the first and second conveyers and is spaced from the second conveyer by a predetermined distance. The take-out device is disposed between the second conveyer and the third conveyer and arranged and is operable to take out the noodle casings from the punched folded sheet. The fourth conveyer is disposed below the take-out device and receives the noodle casings from the take-out device and transfers the noodle casings to a next step. The take-out device is operable between a first position for defining the same transfer level as the second and third conveyer and a second position for permitting the noodle casings in the punched folded sheet to fall onto the fourth conveyer.

With this arrangement, it is possible to automatically, smoothly and hygienically perform a series of operations for punching a noodle sheet resulting in noodle casings, separating the noodle casings from the remaining noodle sheet, and transferring the noodle casings and the remaining noodle sheet to respective next steps independently of each other The take-out device can include at least one conveyer unit that is pivotable between a first position and the second position. Preferably, the at least one conveyer includes a conveyer belt that is movable by a drive device.

In another embodiment according to the present invention, the system further includes a releasing agent applying device for applying a releasing agent on opposite surfaces of the noodle sheet during the operation for folding the noodle sheet. With this arrangement, it is possible to easily separate the noodle casings, which are formed in stacked layers by the punching operation, from each other, and it is possible to easily release the noodle casings from punching dies of the punching device.

In a further embodiment according to the present invention, the punching device includes at least two punching dies arranged in series along a transfer direction of the noodle sheet. Each of the at least two punching dies includes a plurality of die parts arranged in a transverse direction to the transfer direction each configured to form one noodle casing. Therefore, a plurality of noodle casings are formed at one time by the die parts of the punching device. In addition, it is possible to form the noodle casings with maximum density per unit area of the folded noodle sheet.

In a still further embodiment according to the present invention, each of the die parts is configured to form one circular noodle casing, and the at least two punching dies include a first punching die having die parts in odd numbers (i.e. of three or more), and a second punching die having the die parts in even numbers (i.e. of 2 or more), and the die parts of the first punching die and the die parts of the second punching die are arranged to be staggered to each other in the transverse direction.

With this arrangement, the noodle casings can be effectively manufactured and it is possible to improve the yield of the noodle casings.

Alternatively, each of the die parts may be configured to form one square noodle casing, and each of the at least two punching dies may include the die parts in odd numbers (i.e. of three or more) or in even numbers (i.e. of two or more), and the die parts in each of the at least two punching dies may be arranged in series in the transfer direction with the die parts in its adjacent punching die. Also with this arrangement, the noodle casings can be effectively manufactured and it is possible to improve the yield of the noodle casings.

In a still further embodiment according to the present invention, the take-out device can be configured to permit the formed noodle casings (arranged in a transverse row) to fall onto the fourth conveyer at one time, and the fourth conveyer can be configured to gently or resiliently receive the noodle casings. With this arrangement, it is possible to effectively transfer the noodle casings to the fourth conveyer and it is possible to prevent the stacked noodle casings on the fourth conveyer from collapsing.

In a still further embodiment according to the present invention, the second and third conveyers can be intermittently driven by a distance corresponding to a pitch of transverse rows of the noodle casings formed by the punching device. With this arrangement, the punching operation for forming the noodle casings and the operation for separating the noodle casings from the folded noodle sheet can be smoothly and effectively performed in a sequential manner.

In a still further embodiment according to the present invention, the third conveyer is intermittently driven in synchronism with the movement of the take-out device between a first and second position. With this arrangement, it is possible to reliably transfer the remaining folded noodle sheet alone to a next step.

In a still further embodiment according to the present invention, a cutting device is disposed above the third conveyer and is operable to cut the remaining folded noodle sheet that has been transferred onto the third conveyer.

DETAILED DESCRIPTION OF THE INVENTION

Each of the additional features and teachings disclosed above and below may be utilized separately or in conjunction with other features and teachings to provide improved systems for manufacturing noodle casings. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 1:
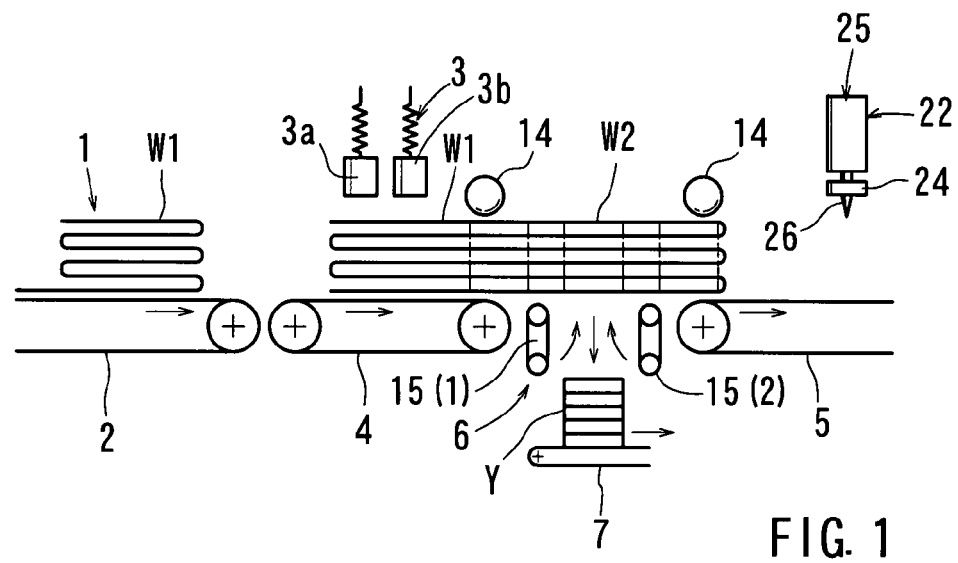
FIG. 1 is a schematic view of a system for manufacturing noodle casings according to a representative embodiment of the present invention.

One embodiment according to the present invention will now be described with reference to the drawings. Referring to FIG. 1, the general construction of a representative system for manufacturing food products, such as noodle casings, is shown. The system includes a folding device 1 for folding a noodle sheet W1. This can be preformed in a predetermined time and a predetermined length. The system also includes a first conveyer 2 disposed below the folding device 1, a punching device 3 for punching the folded noodle sheet W1 in order to obtain a plurality of products or noodle casings Y, and a second conveyer 4 disposed to vertically oppose to the punching device 3. The second conveyer is positioned at a transfer level of the first conveyer 2. The system further includes a third conveyer 5 for transferring the remaining folded noodle sheet W2 to a next step, such as a recovering step. Here, the remaining folded noodle sheet W2 is a portion of the folded noodle sheet W1 other than the noodle casings Y that are formed by the punching operation. The third conveyer 5 is spaced from the second conveyer 4 by a distance and is positioned at the transfer level of the first conveyer 2 and the second conveyer 4. A take-out device 6 is disposed between the second conveyer 4 and the third conveyer 5 for aiding in the transfer of the noodle casings Y from the transferring path between the second conveyer 4 and the third conveyer 5. A fourth conveyer 7 is disposed below the take-out device 6 in order to receive the noodle casings Y from the take-out device 6 and to transfer the noodle casings Y to a next step, such as a packaging step. In this embodiment, the second and third conveyers 4 and 5 can be intermittently driven in response to a punching cycle of the punching device 3. Thus, during the punching operation against the folded noodle sheet W1, the second and third conveyers 4 and 5 may be stopped. After the punching operation, the second and third conveyers 4 and 5 are moved a pitch in order to perform the next punching operation against the folded noodle sheet W1.

Figure 7:
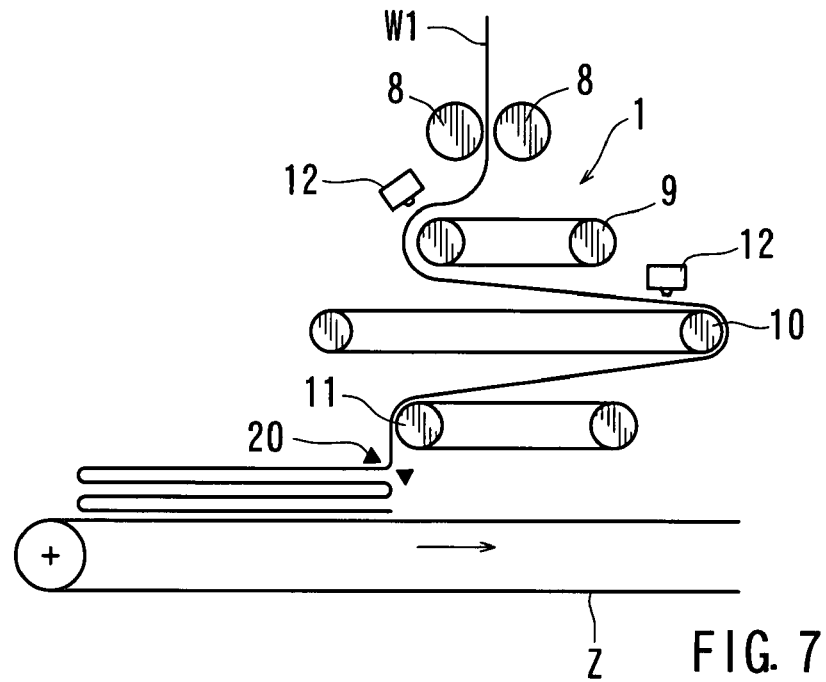
FIG. 7 is a schematic view of a folding device of the system.

As shown in FIG. 7, the folding device 1 primarily includes a pair of rollers 8 for rolling the noodle sheet W1 from opposite sides, plural steps of conveyers 9, 10 and 11 for transferring the rolled noodle sheet W1 in a zigzag manner, and a cutter 20 for cutting the noodle sheet W1, so that the cut noodle sheet W1 is folded over the first conveyer 2 in a predetermined time and length for each fold as the first conveyer 2 is moved. To this end, the conveyer 11 can be moved reciprocally horizontally. Preferably, at least two sprayers 12 and 13 are disposed at suitable positions relative to the conveyers 9, 10 and 11 in order to spray a releasing agent, such as powder starch, onto opposite surfaces of the noodle sheet W1.

As shown in FIG. 1, the punching device 3 includes a first die 3a and a second die 3b arranged in series in the transfer direction of the second conveyer 4. In this embodiment, the first die 3a includes three die parts arranged transversely to the transfer direction of the folded noodle sheet W1. The second die 3b includes two die parts arranged transversely to the transfer direction of the folded noodle sheet W1. The first and second dies 3a and 3b are simultaneously moved upward and downward, so that five noodle casings Y can be formed by a single downward stroke of movement of the punching device 3. Although the total five die parts corresponding to the noodle casings Y are provided in this embodiment, the punching device 3 may have any other number of die parts or may have fourth or more dies. Further, although the noodle casings Y have circular configurations in this embodiment, any other configurations may be possible.

Rotatable holding rollers 14 are respectively provided at positions above the downstream-side end of the second conveyer 4 and above the upstream-side end of the third conveyer 5 in order to hold the upper surface of the folded noodle sheet W1 from the upper side.

Figure 5:
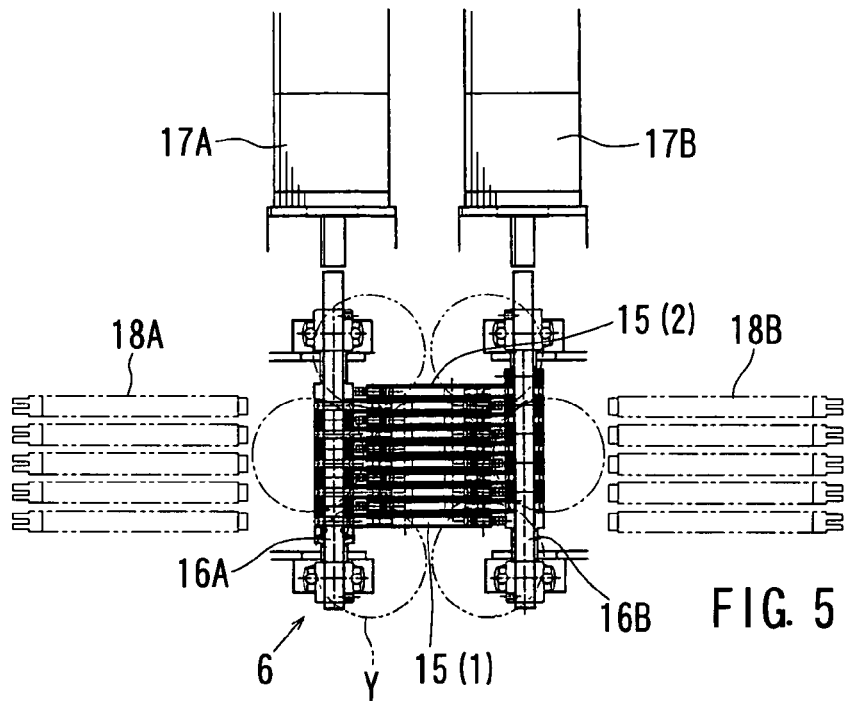
FIG. 5 is a plan view of the take-out device.
Figure 6:
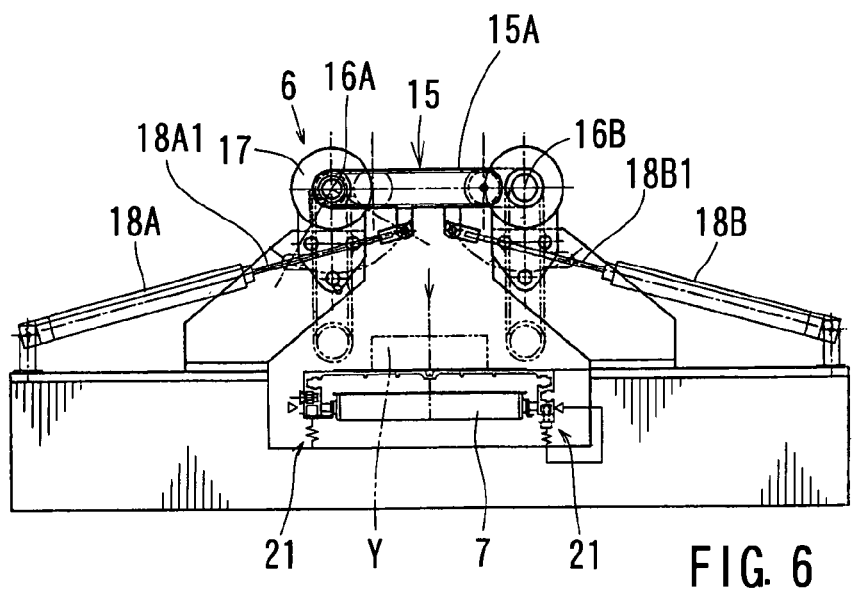
FIG. 6 is a side view of the take-out device.

As shown in FIGS. 5 and 6, the take-out device 6 primarily includes a plurality of conveyer units 15 each having a conveyer belt 15A and arranged in parallel to each other. The conveyer units 15 can be alternately arranged in the transverse direction with respect to the transferring direction. For example, as shown in FIG. 5, conveyer units 15(1) and 15(2) can alternate. Conveyer unite 15(1) is also known as a first group of conveyer units and conveyer unit 15(2) is also known as a second group of conveyer units. Thus, conveyer units 15(1) are rotatably supported by a rotary shaft 16A disposed proximally to the downstream-side end of the second conveyer 4. Conveyer belts 15A of the conveyer units 15(1) are coupled to the rotary shaft 16A, so that the conveyer belts 15A circulates as the rotary shaft 16A rotates. Similarly, the conveyer units 15(2) are rotatably supported by a rotary shaft 16B disposed proximally to the upstream-side end of the third conveyer 5. Conveyer belts 15A of the conveyer units 15(2) are coupled to the rotary shaft 16B, so that the conveyer belts 15A circulates as the rotary shaft 16B rotates.

The rotary shafts 16A and 16B are respectively coupled to motors 17A and 17B, which can be intermittently driven in synchronism with the punching cycle of the punching device 3 in order to transfer the remaining noodle sheet W2. In addition, the motors 17A and 17B can rotate in the same speed and in the same direction, so that the conveyer belts 15A of the conveyer units 15(1) and 15(2) can circulate in the same direction at the same speed.

Further, the conveyer units 15(1) can be respectively pivotally joined to piston rods 18A1 of power cylinders 18A, so that the conveyer units 15(1) can pivot about the rotary shaft 16A as the power cylinders 18A are operated to extend or retract their piston rods 18A1. Similarly, the conveyer units 15(2) can be respectively pivotally joined to piston rods 18B1 of power cylinders 18B, so that the conveyer units 15(2) can pivot about the rotary shaft 16B as the power cylinders 18B are operated to extend or retract their piston rods 18B1. The power cylinders 18A and 18B may be pneumatic or hydraulic cylinders.

With this arrangement, in order to transfer the remaining noodle sheet W2, the first and second groups of the conveyer units 15 are held to extend horizontally in order to maintain the same transfer level as the second and third conveyers 4 and 5 (hereinafter also called "close position"). On the other hand, in order to take out the noodle casings Y, the first and second groups of the conveyer units 15 are pivoted to extend vertically as shown in FIG. 1 and as indicated by chain lines in FIG. 6 (hereinafter also called "open position"), so that a part of the transfer path is interrupted by a distance slightly greater than the length in the transferring direction of the noodle casing Y (the diameter of the noodle casing Y in this embodiment). Therefore, the noodle casings Y may fall by the gravity force and may then be stacked onto the fourth conveyer 7. Of course, the pivotal movement of the conveyer units 15 between the close position and the open position is performed in synchronism with the movement of the second conveyer 4 or the punching operation of the punching device 3.

As shown in FIG. 6, the fourth conveyer 7 can include dampers 21, such as shock absorbers or springs, disposed on opposite sides in the widthwise direction, so that the falling noodle casings Y can be gently or resiliently received by the surface (the surface of a conveyer belt) of the fourth conveyer 7. Therefore, it is possible to ensure that the falling noodle casings Y are stacked onto the surface of the fourth conveyer 7, thereby reducing the possibility of collapse.

Figure 8:
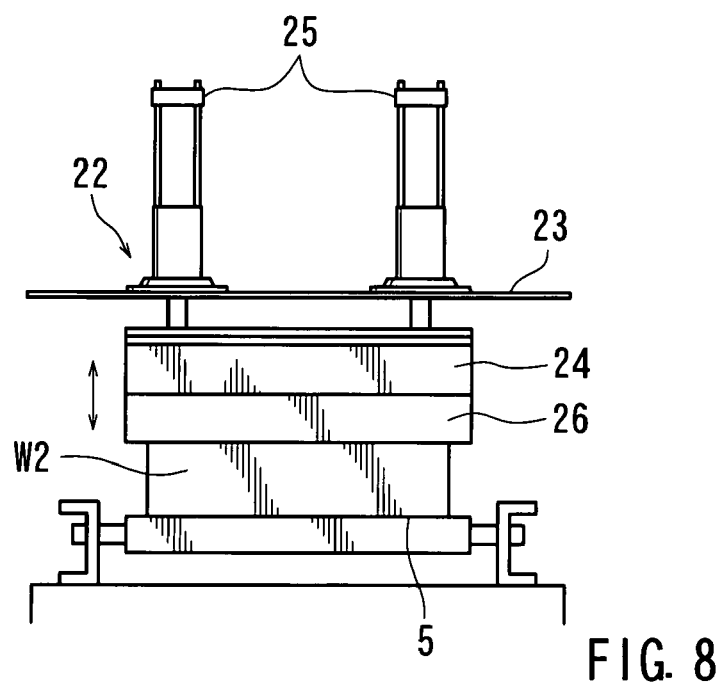
FIG. 8 is a side view of a cutting device for cutting the remaining noodle sheet.

As shown in FIGS. 1 and 8, a cutting device 22 is disposed above the third conveyer 5 and is operable to cut the remaining noodle sheet W2. More specifically, the cutting device 22 includes a fixed frame 23 disposed above the third conveyer 5 and extending horizontally in a direction transverse to the transferring direction of the remaining noodle sheet W2. Actuators 25, such as pneumatic or hydraulic cylinders, are mounted to the fixed frame 23 and are joined to a movable base 24, so that the movable base 24 can move vertically relative to the fixed frame 23 between the fixed frame 23 and the upper surface of the third conveyer 5. A cutting blade 26 is attached to the lower portion of the movable base 24 and extends downward therefrom. The cutting blade 26 can have a width in the transverse direction to the transferring direction of the third conveyer 5.

Figure 9:
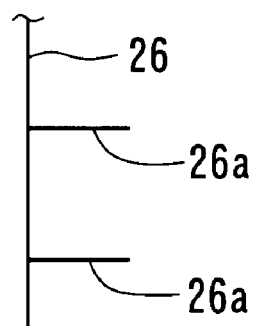
FIG. 9 is a schematic cross sectional view of a cutting blade of the cutting device.

As shown in FIG. 9, the cutting blade 26 has a pair of parallel cutting edges 26a that are arranged in the transferring direction. The distance between the cutting edges 26a can be set to be slightly greater than the length in the transferring direction of the noodle casing Y (the diameter of the noodle casing Y in this embodiment). Therefore, the cutting edges 26a may cut the remaining noodle sheet W2 at positions on opposite sides of the transverse array of the punched holes after removal of the noodle casings Y. Also, the cutting blade 26 can be actuated in synchronism with the operation of the conveyer units 15 of the take-out device 6. More specifically, the cutting operation of the cutting blade 16 is performed in synchronism with the operation for pivoting the conveyer units 15 of the take-out device 6 into the open position.

According to the representative system for manufacturing noodle casings described above, the folding device 1 first rolls the noodle dough to reduce its thickness, so that the noodle sheet W1 is formed in the region above the first conveyer 2. The folding device 1 then folds the noodle sheet W1 so that the folded noodle sheet W1 is formed with edges in the lengthwise direction of the noodle sheet layers being substantially aligned with each other.

After the noodle sheet W1 has been folded, the noodle sheet W1 is cut by the cutting device 20. Preferably, the number of folds corresponds to the number of noodle casings Y that are packed in a single package.

It is possible to easily separate the stacked noodle casings Y from each other after the punching operation by providing a releasing agent (the power starch in this embodiment) which is sprayed onto opposite surfaces of the noodle sheet W1 before the noodle sheet W1 is folded. In addition, it is possible to easily separate the formed noodle casings Y from the punching dies 3a and 3b.

Figure 2:
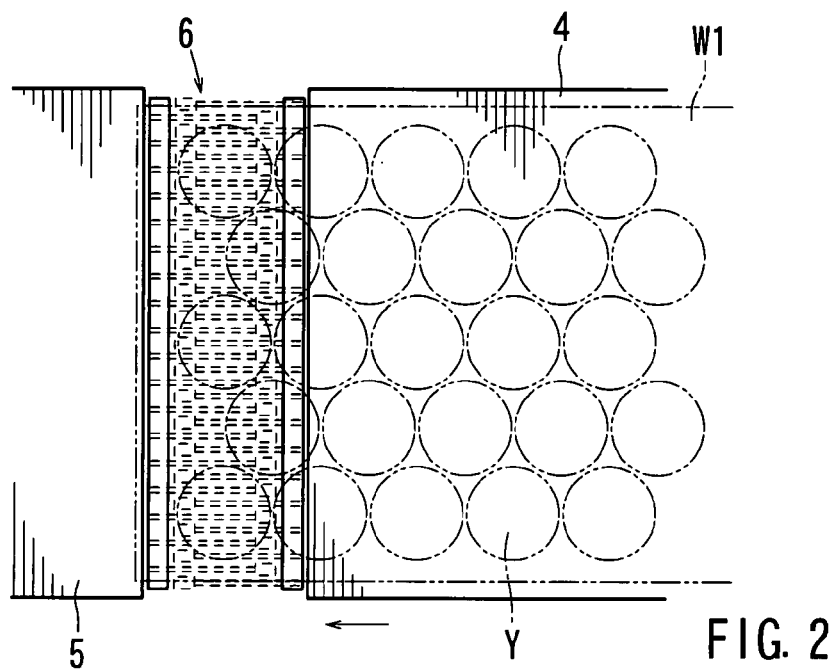
FIG. 2 is an exploratory plan view showing the noodle casings punched by a punching device of the system.
Figure 3:
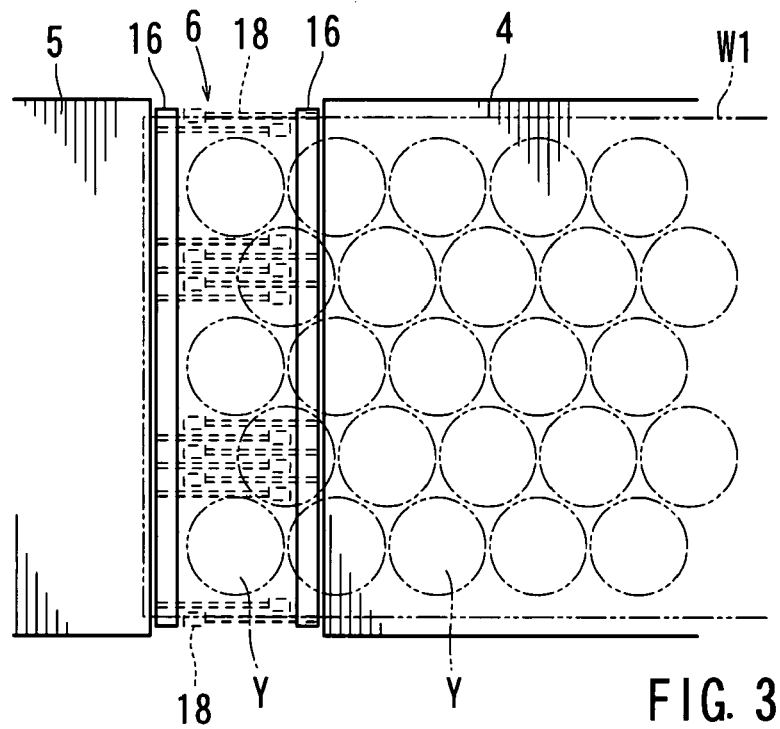
FIG. 3 is an explanatory plan view showing the operation for transferring a noodle sheet, which has been punched to form noodle casings, to a take-out device of the system.
Figure 4:
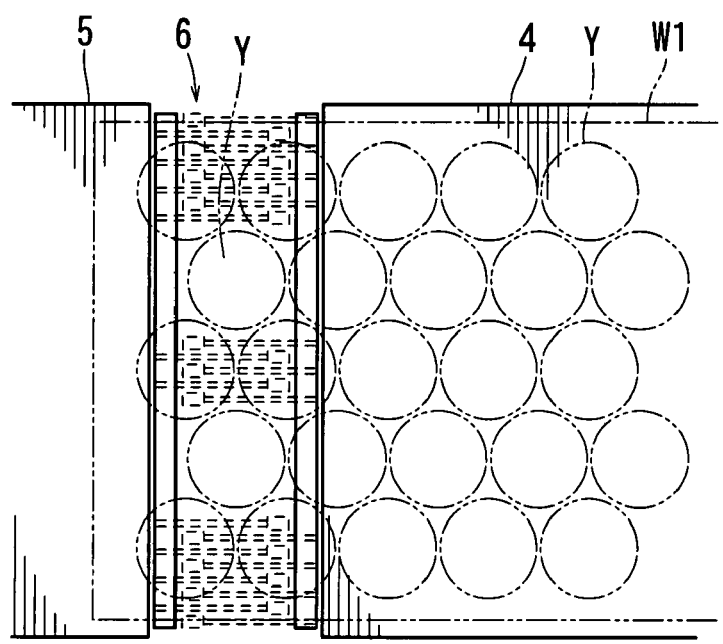
FIG. 4 is an explanatory plan view similar to FIG. 3 but showing the operation where the noodle sheet after the punching operation has moved by one pitch from the state shown in FIG. 3.

The folded noodle sheet W1 prepared on the first conveyer 2 is then transferred to the second conveyer 4. The second conveyer 4 is intermittently driven in synchronism with the punching operation performed by the punching device 3, so that noodle casings Y are formed by the punching die 3a (in this embodiment including three die parts arranged in a row in a direction transverse to the transferring direction), and at the same time noodle casings Y are formed by the punching die 3b (in this embodiment including two die parts arranged in the transverse direction). Thus, in this embodiment, five noodle casings Y are formed at one time by the punching device 3. In this embodiment, the noodle casings Y are formed such that the centers of the adjoining noodle casings Y are spaced approximately equally from each other as shown in FIG. 2. In particular, the centers of the noodle casings Y define apexes of equilateral triangles when lines are drawn passing through the centers of the noodle casings Y. Therefore, the density of the noodle casings Y per unit area of the folded noodle sheet W1 can be maximized and the yield can be improved.

After the punching operation, the noodle casings Y are intermittently moved together with the remaining noodle sheet W2 along the second conveyer 4 by a distance corresponding to the pitch of the noodle casings Y with respect to the transferring direction. When each transverse row of the noodle casings Y has moved entirely onto the conveyer units 15, the conveyer units 15 pivot from the open position to the open position by the respective power cylinders 18A and 18B, so that the noodle casings Y in each transverse row are removed from the remaining folded noodle sheet W2 and fall onto the fourth conveyer 7. To this end, the conveyer units 15 are moved to the open position at the same time that the second conveyer 4 has stopped and the punching device 3 has been operated to perform the punching operation. Also, the fourth conveyer 7 may be moved intermittently in synchronism with the movement of the second conveyer 4.

Because the fourth conveyer 7 includes the dampers 21, the noodle casings Y falling from the transfer level can be gently or resiliently received by the surface of the fourth conveyer 7. Therefore, it is possible to reduce the possibility of the stacked noodle casings Y from being collapsed.

The roller 14 positioned at the downstream-side end of the second conveyer 4 holds the noodle casings Y and the remaining noodle sheet W2 before moving to the take-out device 6. In addition, the roller 14 positioned at the upstream-side end of the third conveyer 5 holds the remaining folded noodle sheet W2 after the noodle casings Y have been removed. Therefore, the noodle casings Y can be reliably transferred to the take-out device 6 and the remaining folded noodle sheet W2 can be reliably transferred to the third conveyer 5.

The noodle casings Y stacked onto the fourth conveyer 7 are then transferred to the next step, such as a packaging step. After the noodle casings Y (in the transverse row) have fallen onto the fourth conveyer 7 and stacked thereon, the conveyer units 15 may be closed to support the remaining folded noodle sheet W2. The conveyer belts 15A are then driven by the respective motors 17A and 17 in order to reliably transfer the remaining folded noodle sheet W2 toward the third conveyer 5 by a distance corresponding to one pitch of the noodle casings Y in the transferring direction. Simultaneously, the third conveyer 5 and the fourth conveyer 7 move by a distance corresponding to one pitch of the noodle casings Y in the transferring direction.

The remaining folded noodle sheet W2 that has been transferred to the third conveyer 5 is then cut by the cutting device 22. The cutting operation is performed when the third conveyer 5 is stopped or when the conveyer units 15 of the take-out device 6 are opened. Therefore, the remaining folded noodle sheet W2 is cut in the transverse direction at two positions on the opposite sides of the transverse row of the holes that are formed after removal of the noodle casings Y. This cutting operation of the remaining noodle sheet W2 on the third conveyer 5 can reduce the negative effect of deformation or elongation of the punched holes on the noodle sheet W1 prior to or after the punching operation due in the transferring direction. In addition, it is possible to enable the noodle casings Y to fall in a proper form and to be properly stacked onto the fourth conveyer 7.

The cut pieces of the remaining folded noodle sheet W2 after the cutting operation by the cutting device 22 are then transferred to the recovering step by the third conveyer 5. At the recovering step, a chopper (not shown) may further cut the cut pieces into smaller pieces. In addition, the releasing agent, such as powder starch, applied onto opposite surfaces of the noodle sheet W1 can be recovered. In this way, the remaining noodle sheet W2 can be reused for forming the noodle dough.

Therefore, according to an embodiment of the present invention, the noodle casings Y and the remaining folded noodle sheet W2 can be automatically completely separated from each other and can be transferred to the respective next steps independently of each other.

In summary, according to an embodiment according to the present invention, without need of manual operation, it is possible to automatically smoothly and hygienically perform a series of operations, such as folding the noodle sheet W1 by plural times, spraying the releasing agent onto opposite surfaces of the noodle sheet W1, punching the folded noodle sheet W1 to obtain the noodle casings Y, separating the noodle casings Y from the remaining noodle sheet W2, and transferring the noodle casings Y and the remaining noodle sheet W2 to the respective next steps independently of each other.

In the above representative embodiments, the punching device 3 includes two punching dies including the punching die 3a having three die parts and the punching die 3b having two die for punching the noodle casings Y having circular configurations. Thus, the die parts of the punching die 3a are provided in odd numbers, and the die parts of the punching die 3b are provided in even numbers. The die parts of the punching die 3a are staggered in the transverse direction relative to the die parts of the punching die 3b in order to maximize the density of the noodle casings Y that can be obtained.

Figure 10:
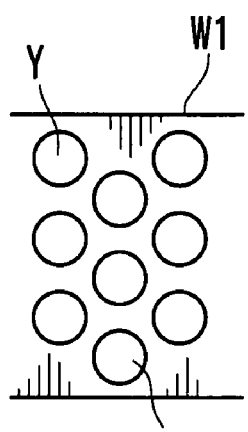
FIGS. 10(A) and 10(B) are plan views showing noodle casings respectively formed by punching devices according to alternative embodiments.
Figure 10:
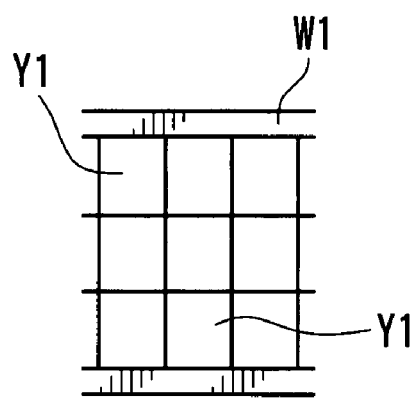

However, both of the punching dies 3a and 3b may have the same number of die parts. For example, both of the punching dies 3a and 3b may have three die parts, so that the noodle casings Y may be punched as shown in FIG. 10(A). Further, the die parts may be configured to punch noodle casings Y1 having square configurations as shown in FIG. 10(B). Therefore, the number of punching dies, the number of die parts, the arrangement and configurations of die parts can be selectively suitably determined.

The invention claimed is:

1. A system for manufacturing noodle casings, comprising:
   a folding device arranged and constructed to roll a noodle dough into a noodle sheet having a predetermined thickness and to fold the noodle sheet in a predetermined time and a predetermined length;
   a first conveyer arranged and constructed to transfer the noodle sheet and having a transfer level;
   a second conveyer arranged and constructed to receive the noodle sheet from the first conveyer and positioned at the transfer level;
   a punching device disposed to oppose the second conveyer and arranged and constructed to punch the noodle sheet to form noodle casings, so that the punched sheet includes the noodle casings and a remaining noodle sheet;

a third conveyer arranged and constructed to receive the remaining noodle sheet from the second conveyer and to transfer the remaining folded noodle sheet to a next step, wherein the third conveyer is positioned at the transfer level and is spaced from the second conveyer by a distance;

a take-out device disposed between the second conveyer and the third conveyer and arranged and constructed to separate the noodle casings from remaining noodle sheet; and a fourth conveyer, at least a portion of the fourth conveyer being disposed directly below the take-out device and arranged and constructed to receive the separated noodle casings and to transfer the separated noodle casings;

wherein the take-out device is a separate device from the fourth conveyor and comprises first and second conveyor units, each of said conveyor units being pivotable between a first position positioned at the transfer level and a second position allowing the noodle casings to fall onto the fourth conveyer, the first and second conveyor units each comprising a conveyor belt and a drive device causing the conveyor belt to circulate.

2. The system as defined in claim 1, further comprising a releasing agent applying device for applying a releasing agent on opposite surfaces of the noodle sheet wherein the releasing agent applying device is positioned proximate the folding device.

3. The system as in claim 1, wherein the punching device comprises at least two punching dies arranged in series along a transfer direction of the folded noodle sheet, wherein each of the at least two punching dies includes a plurality of die parts arranged in a transverse direction to the transfer direction each configured to form one noodle casing.

4. The system as in claim 3, wherein each of the die parts is configured to form one circular noodle casing, and the at least two punching dies include a first punching die having the die parts in odd numbers of three or more, and a second punching die having the die parts in even numbers of 2 or more, and the die parts of the first punching die and the die parts of the second punching die are arranged to be staggered to each other in the transverse direction.

5. The system as in claim 3, wherein each of the die parts is configured to form a square shaped noodle casing, and each of the at least two punching dies includes the die parts in odd numbers of three or more or in even numbers of two or more, and the die parts in each of the at least two punching dies are arranged in series in the transfer direction with the die parts in its adjacent punching die.

6. The system as in claim 1, wherein the fourth conveyer includes a damper.

7. The system as in claim 1, wherein the second and third conveyers are intermittently driven by a distance corresponding to a pitch of the noodle casings in the transfer direction formed by the punching device.

8. The system as in claim 1, wherein the third conveyer is intermittently driven in synchronism with the movement of the take-out device between the first and second positions.

9. The system as in claim 1, further comprising a cutting device disposed above the third conveyer and operable to cut the remaining noodle sheet that has been transferred onto the third conveyer.

10. A system for manufacturing noodle casings, comprising:

a folding device capable to roll a noodle dough into a noodle sheet;

a first conveyer capable of transferring the noodle sheet and positioned at a transfer level;

a second conveyer capable of receiving the noodle sheet from the first conveyer and positioned at the transfer level;

a punching device positioned above the second conveyer and capable of punching the noodle sheet to form noodle casings and a remaining noodle sheet;

a third conveyer capable of receiving the remaining noodle sheet from the second conveyer and to transfer the remaining folded noodle sheet to a next step, wherein the third conveyer is positioned at the transfer level and is spaced from the second conveyer by a distance;

a take-out device positioned between the second conveyer and the third conveyer and capable of separating the noodle casings from remaining noodle sheet; and a fourth conveyer, at least a portion of the fourth conveyer being disposed directly below the take-out device and capable of receiving the separated noodle casings and to transfer the separated noodle casings;

wherein the take-out device is a separate device from the fourth conveyor and comprises first and second conveyor units, each of said conveyor units being pivotable between a first position parallel to the transfer direction and a second position perpendicular to the transfer direction, the first and second conveyor units each comprising a conveyor belt and a drive device causing the conveyor belt to circulate.

11. The system as defined in claim 10, further comprising a releasing agent applying device for applying a releasing agent on opposite surfaces of the noodle sheet wherein the releasing agent applying device is positioned proximate the folding device.

12. The system as in claim 10, wherein the punching device comprises at least two punching dies positioned along a transfer direction of the folded noodle sheet, wherein each of the at least two punching dies includes a plurality of die parts arranged in a transverse direction to the transfer direction.

13. The system as in claim 10, wherein the fourth conveyer includes a damper.

14. A system for manufacturing noodle casings, comprising:

a folding device capable to roll a noodle dough into a noodle sheet;

a first conveyer capable of transferring the noodle sheet and positioned at a transfer level;

a second conveyer capable of receiving the noodle sheet from the first conveyer and positioned at the transfer level;

a punching device positioned above the second conveyer and capable of punching the noodle sheet to form noodle casings and a remaining noodle sheet;

a third conveyer capable of receiving the remaining noodle sheet from the second conveyer and to transfer the remaining folded noodle sheet to a next step, wherein the third conveyer is positioned at the transfer level and is spaced from the second conveyer by a distance;

a take-out device positioned between the second conveyer and the third conveyer and capable of separating the noodle casings from remaining noodle sheet; and a fourth conveyer, at least a portion of the fourth conveyer being disposed directly below the take-out device and capable of receiving the separated noodle casings and to transfer the separated noodle casings;

wherein the take-out device is a separate device from the fourth conveyor and comprises first and second groups of conveyor units, at least one conveyor unit of each said group being pivotable between a a horizontal position and a vertical position to allow the noodle casing to fall onto the fourth conveyer, each of the conveyor units comprising a conveyor belt and a drive device causing the conveyor belt to circulate.

15. The system as defined in claim 14, wherein the first group is intermingled with the second group.

16. The system as in claim 14, wherein each of said conveyor units is connected to a piston capable of moving the conveyer unit from the first position to the second position.

* * * * *